March 4, 1958
S. F. ANDERSON
2,825,435
LATCH OPERATED CLUTCH WITH PIVOTED DOG
Filed May 24, 1956
2 Sheets-Sheet 2
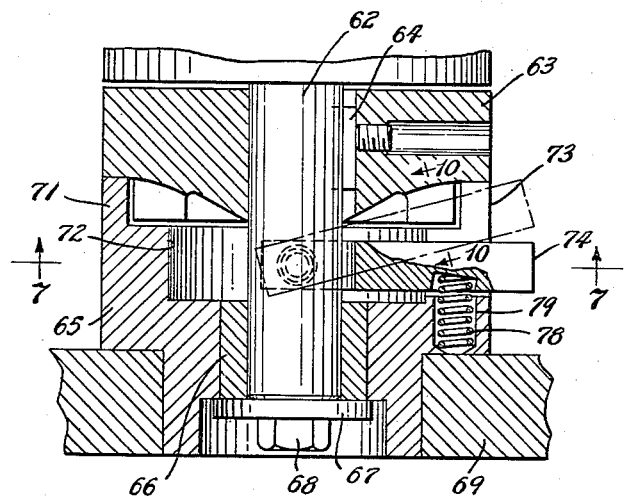
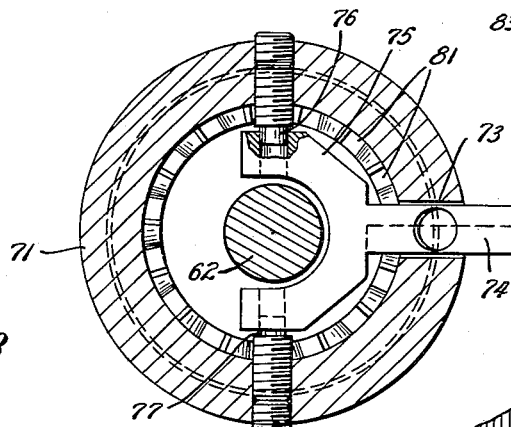
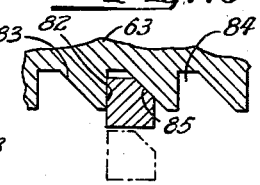
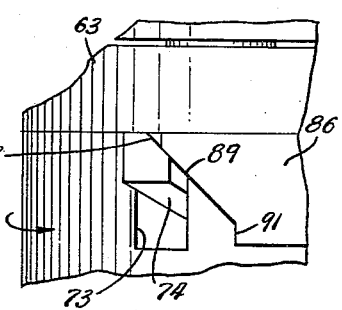
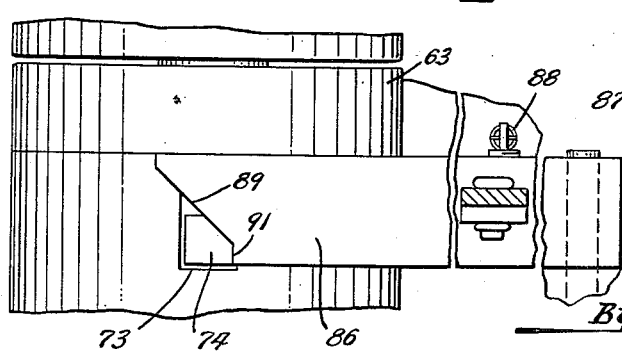
Inventor
Swan F. Anderson
By McCanna and Morsbach
Attys.

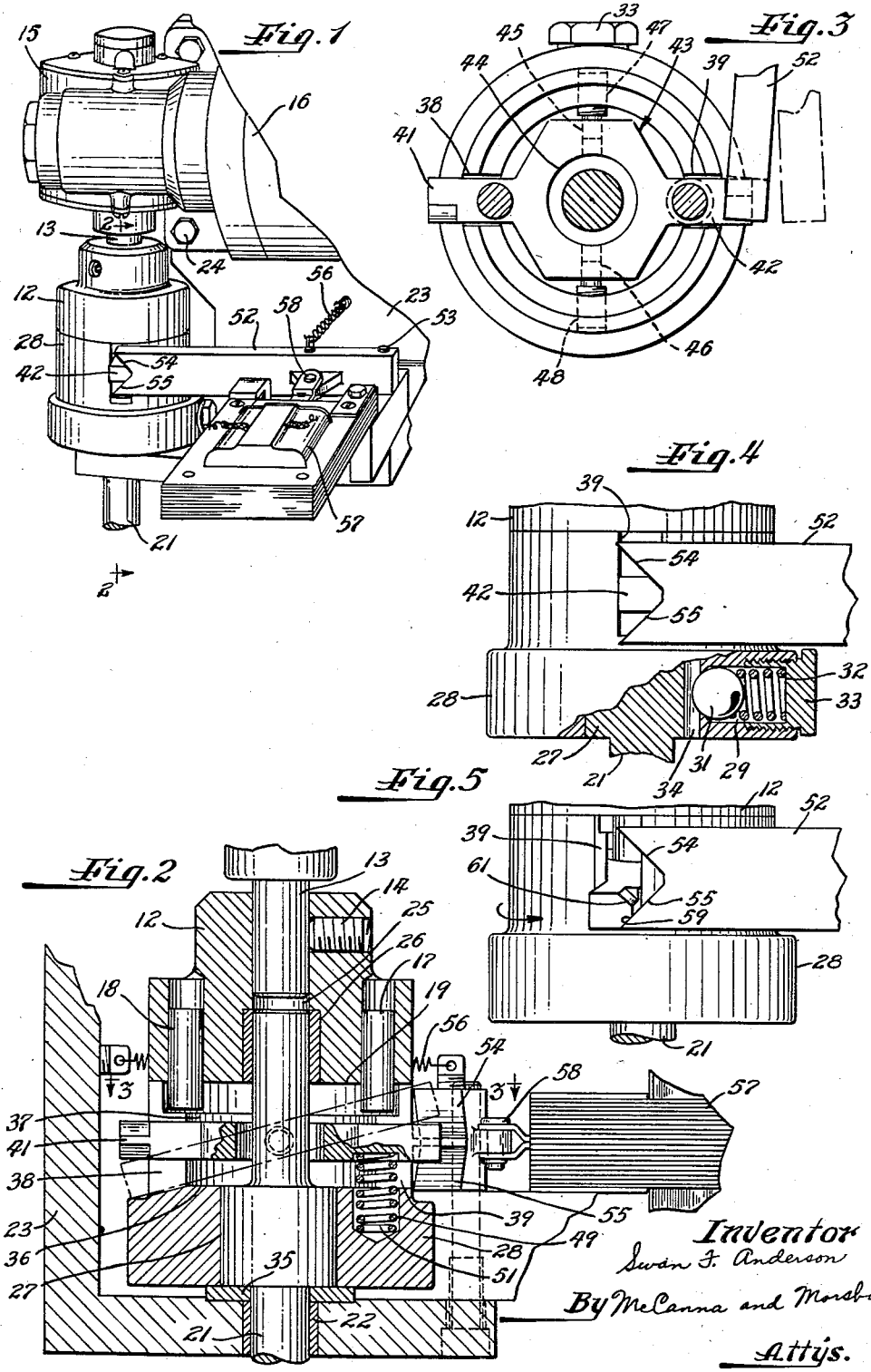

United States Patent Office
2,825,435
Patented Mar. 4, 1958

2,825,435

LATCH OPERATED CLUTCH WITH PIVOTED DOG

Swan F. Anderson, Rockford, Ill., assignor of one-half to Ralph F. Anderson, Rockford, Ill.

Application May 24, 1956, Serial No. 586,983

7 Claims. (Cl. 192—22)

This invention relates to mechanical clutches for intermittently engaging a driven shaft or member with a driving shaft or member and for interrupting the rotation of the driven member at a fixed position upon repeated operation.

Important objects of the invention are the provision of a mechanical clutch of simplified and improved structure which is self-enclosed and inexpensive to manufacture, which may be constructed to interrupt the drive therethrough at a single fixed point in the revolution of the driven member or at a plurality of fixed points without accurate setting of the operating mechanism and which may be operated as a full revolution or as a half revolution clutch.

Other objects and advantages will appear from the following description in which:

Figure 1 is a perspective view showing the clutch and a suitable driving motor;

Fig. 2 is a section on the line 2—2 of Fig. 1;

Fig. 3 is a section on the line 3—3 of Fig. 2 on a larger scale;

Fig. 4 is a fragmentary side elevation showing the clutch operating lever and the overload release, the clutch drive arm being shown in neutral position;

Fig. 5 is a view similar to Fig. 4 showing a moved position of the clutch;

Fig. 6 is a longitudinal section through another embodiment of the invention;

Fig. 7 is a section on the line 7—7 of Fig. 6.

Fig. 8 is a fragmentary side elevation of the embodiment of Fig. 6 showing the clutch operating lever and the drive arm in neutral position;

Fig. 9 is a fragmentary view similar to Fig. 8 showing the clutch approaching neutral position, and Fig. 10 is a section on the line 10—10 of Fig. 6.

Referring first to the embodiment shown in Figs. 1 through 5, the clutch comprises a driving member 12, in this instance in the form of a cast body or plate which is attached to a driving shaft 13 as by a set screw 14 or the like. In Fig. 1, for purpose of illustration the driving shaft 13 comprises the outlet shaft of a reduction gearing 15 secured to the end of an electric motor 16, the two forming a conventional gear head motor. The driving member 12 is preferably circular in cross-section and at diametrically opposed points has pins 17 and 18 secured therein and projecting from an inner face 19. Coaxially disposed with respect to the driving shaft 13 is a driven shaft 21 passing through a bearing 22 in a bracket 23 which may suitably be affixed to the gear head motor 16 as by cap screws 24 (Fig. 1). The end of the driven shaft 21 projects into a bore 25 in the driving member 12 and is supported on a bearing 26 for relative rotation between the driving member and the end of the driven shaft. The driven shaft has an enlarged portion 27 on which is mounted a driven member 28, the driven member having a bore 29 (see Fig. 4) for the reception of a ball 31 pressed inwardly by a compression spring 32 which is tensioned by a cap 33 threaded into the bore 29. The spring urges the ball inward and into an arcuate groove 34 in the enlarged portion 27 of the shaft so as to transmit driving force from the driven member 28 to the shaft through the ball, but releases in the event of overload on the driven shaft 21. A bearing plate 35 (Fig. 2) is interposed between the bracket 23 and the outer face of the enlargement 27 and driven member 28.

The driven member 28 has an inner face 36 in spaced relation to the inner face 19 of the driving member and has an annular flange or wall 37 extending toward the face 19 and preferably substantially into contact therewith to provide a cavity within the driven member. The annular wall 37 is interrupted at diametrically opposed points by slots 38 and 39 for the passage of fingers 41 and 42 of a drive arm indicated generally at 43 and best shown in Fig. 3.

The drive arm 43 has a large central opening 44 for the passage of the shaft 21 therethrough, and is provided with bores 45 and 46 for the reception of pivot pins 47 and 48 threaded into the annular wall 37 to pivotally support the drive arm for rotation on an axis disposed crosswise of the plane of the fingers 41 and 42 and normal to the axis of the shafts. The driven member 28 has a socket 49 for the reception of a compression spring 51 which bears against one side of the drive arm 43 to bias the arm in a counterclockwise direction facing Fig. 2 about the pivot pins 47 and 48 to bring the finger 42 into the path of rotation of the pins 17 and 18 as shown in dotted lines in Fig. 2.

An operating lever 52 is mounted on the bracket 23 by a pivot 53, one end of the lever having converging cam faces 54 and 55, a tension spring 56 acting between the bracket and the lever to cause the end of the lever to bear against and ride the side of the driven member 28 as best shown in Fig. 2. Means are provided for rotating the lever about the pivot 53 to bring the end of the lever away from the driven member, which in this instance comprises a solenoid 57 arranged to be energized from a suitable source of power to effect this operation. The spring 56 serves to return the lever to the position shown.

The free ends of the fingers 41 and 42 project beyond the perimeter of the driven member 28 as will be apparent from the drawings, and the free end of the lever 52 is positioned to bear against the outer surface of the driven member 28, under the influence of spring 56, in the path of travel of the protruding ends of the fingers. In the neutral position of the clutch the parts occupy the position shown in Figs. 1 through 4 wherein the drive arm is held by the operating lever in the full line position of Fig. 2. In this position the driving member 12 and the pins 17 and 18 rotate free of the driven member. To initiate operation of the driven member and bring about rotation of the shaft 21 the solenoid 57 is energized and thereupon acts through the pivotal connection 58 to move the operating lever 52 from the full line position of Fig. 3 to the dotted line position thereof, thus releasing the drive arm 43 which tilts to the dotted line position of Fig. 2 under the action of spring 51, thus bringing the finger 42 into the path of travel of one of the pins 17 and 18. The drive member 12 travels free of the driven member until one of the pins engages against the side of the finger 42, whereupon the driving and driven members travel in unison. When the solenoid 57 is de-energized the spring 56 brings the operating lever 52 back to the full line position of Figs. 3 and 2. If the operating lever 52 is immediately returned to this position it will be disposed to be engaged by the finger 41 as the driven member approaches the completion of a half revolution as shown in Fig. 5, whereupon the cam face 59 of finger 41 comes into contact with cam face 55 of the operating lever and as the driven member continues its rotation moves up cam face 55 to the center position thereby rotating the drive arm about its pivots to move the finger 42 downwardly facing Fig. 2 free of the drive pin, and interrupt rotation of the driven member at the completion of a half revolution. In similar manner, if the operating lever 52 is returned to the full line position as the finger 52 approaches the lever, the cam face 61 of the finger engages cam face 54 of the operating lever thereby bringing the drive arm down to the neutral or full line position of Fig. 2 and interrupting the drive. It will thus be seen that the driven member always stops at one of two positions disposed 180 degrees apart. In other words, the driven shaft is always rotated through a half revolution or multiples thereof. If desired, one of the fingers may be eliminated from the drive arm to provide a one revolution clutch. If, during the course of rotation of the shaft 21, an excessive load is placed thereon, the ball 31 of the overload released rides up out of the groove 34 permitting the driven member to rotate independently of the driven shaft and thereby avoid breakage of the parts.

The embodiment shown in Figs. 6 through 10 embodies essentially the same principle as that previously described but has certain additional advantages. In this construction the numeral 62 indicates a driving shaft to which a driving member 63 is attached by means of a key and set screw 64. Also mounted on the shaft is a driven member 65, a bearing 66 being interposed therebetween, the driven member being retained by a washer 67 and a cap screw 68 disposed at the end of the shaft. The driven member 65 suitably carries a driven element such as a gear or the like, a segment thereof being indicated at 69. The driven member has an annular flange 71 which may have bearing contact with the driving member 62 adjacent its periphery, the flange providing a central chamber 72 within the driven member. The flange has a radial slot 73 for the passage of a finger 74 forming part of a drive arm 75, in this instance in the form of a yoke, the ends of the yoke having openings for the reception of pivot pins 76 and 77 for rotation of the drive arm. A spring 78 disposed within the cavity 79 in the driven member bears against the drive arm to normally urge it upward facing Fig. 6.

Disposed on the inner face of the driven member 63 and arranged annularly of the shaft 62 are spaced teeth 81 best shown in Fig. 10. Each of these teeth has a side 82 disposed in a radial plane with respect to the shaft 62 and facing in the direction of travel and a face 83 sloping away from the apex of the tooth so as to provide a groove such as indicated at 84 between adjacent teeth. The finger 74 has a sloping side 85 to enable the finger to be received between adjacent teeth and into driving engagement with face 62. An actuating arm 86 analogous to the arm 52 is pivoted at 87 and normally caused to ride the outer periphery of the driven member 65 by a spring 88 attached to the actuating lever and to a fixed mounting. The free end of the operating lever 86 has a cam face 89 and an abutment 91 arranged in the path of the finger 74.

When the operating lever 86 is drawn away from the driven member 65 to a point beyond the end of the finger 74, spring 78 moves the drive arm upward as shown in dotted lines in Fig. 6, whereupon it enters between two of the teeth 81 in the manner shown in Fig. 10, as soon as the continuously rotating driving member 63 brings the first recess into position. Thereafter the driven member 74 moves with the driving member until operating lever 86 is allowed to return to engagement with the outer surface of the driven member 65 and thereafter until the finger 74 reaches the position shown in Fig. 8. Toward the end of this movement the cam face 92 of the finger engages against the cam face 89 of the operating lever whereby the finger is forced down to the position of Fig. 8, thereby moving the finger out from between the teeth 81 and into neutral position shown in Fig. 6.

With this construction the driven member is always caused to stop in the identical rotative position. It will be obvious that the operation of this structure may be modified by providing another slot such as the slot 63 at 180 degrees with respect to the slot 73 and by employing a second finger operating in this slot as in the form of Figs. 1 through 5, and modifying the operating lever 6 to provide cam surfaces such as shown in Figs. 4 and 5.

I claim:

1. A clutch comprising in combination a driving member adapted for rotation about an axis, a driven member mounted for rotation and disposed in axial relationship with respect to the driving member for rotation about said axis, the driven member having an annular wall extending toward the driving member into close proximity therewith providing a cavity between the driving and driven members, said wall having radial slots disposed at 180 degrees with respect to each other, a drive element projecting from the driving member into said cavity and spaced radially from said axis, a drive arm pivotally mounted on the driven member within said cavity having fingers projecting through said slots, spring means for biasing said arm about its pivotal mounting to bias one of said fingers toward the driving member into the path of rotation of the drive element, an operating lever mounted on a stationary support for movement toward and away from the driven member, said operating lever having cam surfaces, means for moving said lever to bring said cam surfaces into the path of rotation of said fingers for engagement thereby in the course of travel of said fingers to tilt the drive arm out of engagement with the drive element, and means for moving said lever away from the driven member to move the cam surface out of the path of travel of said fingers for engagement of the drive arm with the drive element under the bias of the spring.

2. A clutch comprising in combination a driving member adapted for rotation about an axis, a driven member mounted for rotation and disposed in axial relationship with respect to the driving member for rotation about said axis, the driven member having an annular wall extending toward the driving member into close proximity therewith providing a cavity between the driving and driven members, said wall having radial slots disposed at 180 degrees with respect to each other, a plurality of drive elements projecting from the driving member into said cavity and spaced radially from said axis, said elements being disposed in annularly spaced relationship, a drive arm pivotally mounted on the driven member on a transverse axis within said cavity having fingers projecting through said slots to points beyond the perimeter of the driven member, spring means for biasing said arm about its pivotal mounting from a neutral position free of the path of travel of said driving members to a drive position in the path of rotation thereof, an operating lever mounted on a stationary support for movement toward and away from the driven member, said operating lever having spaced cam surfaces, means for moving said lever to bring said cam surfaces into the path of rotation of said fingers for engagement by one or the other thereof in the course of travel of said fingers to tilt the drive arm out of engagement with the drive elements and thereby disconnect the clutch, and means for moving said lever away from the driven member to move the cam surfaces away from said fingers whereby the drive arm is rotated into the path of travel of the drive elements under the bias of said spring.

3. A clutch comprising in combination a driving member adapted for rotation about an axis, a driven shaft disposed in axial alignment with the driving member, a bearing in said driving member for supporting one end of the driven shaft, a driven member mounted on said driven shaft having an annular wall extending toward the driving member into close proximity therewith providing a cavity between the driving and driven members, said wall having radial slots disposed at 180 degrees with respect to each other, a pair of drive elements projecting from the driving member into said cavity and spaced radially from said axis at 180 degree intervals, a drive arm pivotally mounted on the driven member within said cavity, said arm being disposed about the driven shaft and having fingers projecting through said slots, spring means for biasing said arm about its pivotal mounting from a neutral position free of the drive elements to bring one of said fingers toward the driving member into the path of rotation of the drive elements and the other finger in the opposite direction whereby said fingers move in axially spaced paths with rotation of the driven member, an operating lever mounted on a stationary support for movement toward and away from the driven member, said operating lever having cam surfaces arranged in the form of an open V, of sufficient width to span the paths of travel of the two fingers, means for moving said lever to bring said cam surfaces into the path of rotation of the fingers whereby said cam surfaces are operative to engage one of the fingers and tilt the drive arm out of engagement with the drive element and thereby move the drive arm to a neutral position, and means for moving the lever away from the drive member to move the cam surfaces free of said fingers for engagement of the drive arm with the drive element under the bias of said spring.

4. A clutch comprising in combination a driving member adapted for rotation about an axis, a driven member disposed in axial relationship with respect to the driving member and mounted for rotation about said axis, a drive element projecting from one member toward the other and spaced radially from said axis, a drive arm disposed between the members pivoted on said other member on an axis transverse to the axis of rotation of said members, said arm having a portion projecting radially beyond the perimeter of said other member, means for moving the arm into the path of rotation of the drive element, said other member having a smooth annular surface, an operating lever having a cam surface thereon, means pivotally mounting said lever on a stationary support for movement toward and away from said other member, spring means biasing said lever into contact with said smooth annular surface with the cam surface on the lever disposed in the path of said projecting portion, and means for rotating said lever on its pivot away from the smooth annular surface to move the cam surface out of the path of travel of said projecting portion of the arm.

5. The combination of claim 3 wherein said driven member is rotatably mounted on said driven shaft, said driven shaft having a recess therein, said driven member having an opening therein adapted to register with said recess, a ball disposed in said opening, and means yieldably urging said ball into said recess when the recess registers with said opening to drivingly connect said driven shaft to said driven member.

6. A clutch comprising, a driving member adapted for rotation about an axis, a driven member including a shaft rotatably supported at one end thereof in said driving member for rotation about an axis aligned with the axis of the driving member, the driven member having an annular wall extending toward the driving member into close proximity to one end thereof and defining a cavity around said shaft between the driving and driven members, said wall having a longitudinally extending slot therein, a drive arm including a yoke straddling said shaft and pivotally mounted on said wall within the cavity for movement about an axis perpendicular to said shaft, said arm including a finger extending through said slot and outwardly of said wall, a drive element on said driving member extending into said cavity in closely spaced adjacency to said wall, spring means yieldably urging said arm about its pivotal mounting into the path of rotation of said drive element, an operating lever mounted on the stationary support externally of said wall for movement toward and away from the driven member, means for moving said lever towards said driven member and into the path of rotation of said finger, said lever having a cam surface engageable with the outer end of said finger in the course of travel thereof to tilt said arm out of engagement with the drive element, and means for moving said lever away from the driven member to move the cam surface thereon out of the path of travel of said finger whereby said drive arm is moved under the bias of said spring into the path of movement of said drive element.

7. The combination of claim 6 wherein a plurality of said driving elements are provided on said driving member and annularly spaced thereon, said finger having a flat radial face on one side thereof and a face inclined to said radial face on the other side thereof, said driving elements each having a flat face disposed in a radial plane engageable with the flat face on said finger, said driving elements each having a face inclined to the radial face on the adjacent driving element and engageable with the inclined face on the finger when the finger engages said last mentioned driving element, said cam surface on said lever being engageable with the inclined face on said finger.

References Cited in the file of this patent
UNITED STATES PATENTS

| | | |
|---|---|---|
| 1,340,333 | France | May 18, 1920 |
| 2,444,148 | Warwick | June 29, 1948 |
| 2,712,866 | Llata | July 12, 1955 |
| 2,717,676 | Johnson | Sept. 13, 1955 |
| 2,742,127 | Mumford | Apr. 17, 1956 |
| 2,758,688 | Pepper | Aug. 14, 1956 |